United States Patent [19]
Berry

[11] 4,161,183
[45] Jul. 17, 1979

[54] VIBRATION SENSITIVE VALVE OPERATING APPARATUS

[76] Inventor: Edwin X. Berry, 6040 Verner Ave., Sacramento, Calif. 95841

[21] Appl. No.: 821,689

[22] Filed: Aug. 4, 1977

[51] Int. Cl.² ............................................. F16K 17/36
[52] U.S. Cl. ........................................ 137/39; 251/66
[58] Field of Search ....................... 137/38, 39; 251/66

[56] References Cited
U.S. PATENT DOCUMENTS

| | | | |
|---|---|---|---|
| 1,742,685 | 1/1930 | Brandon | 137/38 |
| 2,615,460 | 10/1952 | Crow | 137/38 |
| 3,791,396 | 2/1974 | Nelson | 137/38 |
| 4,007,643 | 2/1977 | Matsushita | 137/38 X |

*Primary Examiner*—Robert G. Nilson
*Attorney, Agent, or Firm*—Townsend and Townsend

[57] ABSTRACT

A vibration sensitive valve operating device capable of being tuned to vibrations of predetermined magnitude, such as earthquake-type vibrations of a magnitude causing serious threshold structural damage, and incorporating a latch assembly and triggerable catch assembly providing great force amplification between the holding force, which is a ball weight received in a balance plate concave depression of predetermined contour, and a large mechanical force, e.g. the force exerted on a spring loaded torque arm coupled to a valve stem. The latch assembly includes one or more rail members carrying first and second bearings and pivotable about an axis parallel to the operational axis of the associated valve, the first bearing being engaged with the free end of the torque arm when the device is latched. The catch assembly includes a trigger arm frictionally coupled to the balance plate for rotation therewith about another axis parallel to the latch and valve axes noted and normally engaged with the second bearing. In response to vibrations of predetermined magnitude or greater, the ball weight is dislodged from the balance plate, releasing the trigger arm for rotation, which permits pivotal motion of the latch rail(s) until the torque arm is released.

54 Claims, 20 Drawing Figures

VIBRATION SENSITIVE VALVE OPERATING APPARATUS

BACKGROUND OF THE INVENTION

This invention relates to valve shut-off mechanisms for automatically operating a gas valve or the like to shut off the flow of fluid in a pipeline in response to an earthquake.

Vibration sensitive devices are known which are designed to respond to earthquake vibrations of a predetermined magnitude in order to shut off a valve in a gas conduit or the like. Such devices function as a safety mechanism for reducing the possibility of explosion due to ruptured gas connections downstream of the valve and within a building structure, such as a private dwelling, an apartment building or an office building. Many different designs for such devices have been proposed, of which the disclosures of U.S. Pat. Nos. 2,615,460 and 3,791,396 are believed to be representative.

Known earthquake responsive valve shut-off mechanisms typically suffer from several disadvantages. Some are difficult to install or reset after being tripped, or both; others may only be installed in a horizontal position in order to be fully operative. Some are only responsive to earthquake vibrations of massive proportions; others are sensitive to seismic vibrations unrelated to earthquakes, such as vibrations caused by passing trucks, locomotives or other heavy land vehicles, or frictional forces resulting from mechanical loading; still others can be accidentally tripped by a prowling animal or small child. Some known devices are only compatible with certain types of valve mechanisms, and many require removal of the valve from the gas conduit for installation. Still others require modification of an existing valve installation, and many can only be installed by skilled technical personnel. Many devices are also unprotected against enviromental elements and thus must be tested at frequent intervals to ensure their continued operability. Efforts in the past to design an earthquake responsive valve shut-off mechanism devoid of the above disadvantages have not met with success.

SUMMARY OF THE INVENTION

The invention comprises a low-cost vibration sensitive valve operating device which is only sensitive to earthquake type vibrations and can be "tuned" to predetermined vibration amplitudes and accelerations, requires no special skill to install, can be operatively connected to installed valves without removal or modification of the valve, can be readily installed at non-horizontal angles without modification, requires little or no maintenance, and is highly reliable over prolonged periods of time.

In its broadest aspect, the invention comprises a housing adapted to be secured to a fluid conduit having a valve installed therein, with the valve stem extending into the interior of the housing through an aperture in the side wall thereof. The valve stem is engaged with a torque arm secured at one end to a spring motor means, such as a conventional hydraulically damped door closer, a torsion spring or a linear spring, the torque arm having a free end engaged with a latch assembly. Alternatively, a valve having a stem with a properly shaped free end is employed, with the free end engaged with the latch assembly and the stem coupled to the spring motor means, thereby eliminating the separate torque arm. The latch assembly in turn is engaged with a triggerable catch assembly comprising a trigger arm frictionally secured to a biassed balance plate.

The latch assembly comprises a support member pivotally mounted adjacent one end thereof along an axis parallel to the rotational axis of the associated valve, and is provided with first and second bearing members freely rotatably mounted adjacent the other end thereof about an axis parallel to the pivotal axis of the support member. The first bearing member has a bearing surface normally engaged with the free end of the torque arm or valve stem, while the second bearing member has a bearing surface normally engaged with the free end of the trigger arm.

The balance plate is pivotally mounted about a third axis parallel to the first and second axes and is provided with a counterbias means preferably positioned between the third axis and the latch assembly. The balance plate is also provided with a surface depression in the portion thereof extending in a direction away from the counterweight assembly for receiving a ball weight therein when the mechanism is armed. The depression preferably comprises a partial conic section of predetermined apex angle and radius, optionally terminating in a central partially spherical surface having a radius of curvature equal to or slightly greater than the radius of the ball.

The trigger arm is mounted adjacent one side of the balance plate with one end received on the shaft forming the third axis and is frictionally coupled to the adjacent side of the balance plate preferably by means of a friction pad therebetween. Thus, while the trigger arm normally follows motion of the balance plate about the third axis, the relative angular position of the trigger arm with respect to the balance plate may be forceably changed during installation of the device.

A removable cover is provided for enclosing the latch assembly, balance plate and trigger arm and, optionally, the remaining elements to prevent accidental triggering of the mechanism when armed.

To install to an existing fluid pipe-valve arrangement, the housing is attached to the fluid pipe by suitable clamping means and the valve is rotated about the pipe axis until the valve axis lies in a horizontal plane. All mechanism axes thus lie in a horizontal plane. The mechanism is then armed in the following fashion. The torque arm is forceably rotated to a position in which the arm is substantially parallel to the axis of the pipeline and the latch assembly is pivoted toward the spring motor means until the first bearing surface is engaged with the free end of the torque arm. The balance plate is next rotated along with the trigger arm until the free end of the trigger arm engages the second bearing surface. The balance plate is next rotated relative to the trigger arm until the top surface of the balance plate is substantially horizontal, after which the ball weight is placed in the surface depression formed in the balance plate. Optionally, a leveling device may be incorporated into the upper surface or a side wall of the balance plate to assist in maneuvering the balance plate to a level attitude. The stem of the valve installed in the fluid pipe is manually rotated to the valve open position in which the stem preferably contacts the torque arm. The cover is next installed and the device is then fully armed.

In an alternate embodiment in which the torque arm is eliminated and the valve stem is coupled directly to the spring motor means and latch assembly, installation proceeds by coupling the valve stem to the spring motor means, forceably rotating the valve stem to a position substantially parallel to the axis of the pipeline, and pivoting the latch assembly toward the valve until the first bearing surface is engaged with the free end of the valve stem. The remainder of the installation procedure is substantially identical to that noted above.

Once armed, the invention is triggered in the following manner. The occurrence of an earthquake type seismic vibration of predetermined magnitude sufficient to cause serious damage to the associated structure causes the ball weight to be forced from the surface depression formed in the balance plate and either fall from the balance plate surface entirely or migrate towards or away from the counter bias means. In any of these events, the balance plate becomes unbalanced and pivots about its shaft under the influence of the counter bias means, thereby moving the free end of the trigger arm out of engagement with the second bearing surface. This latter action frees the latch assembly to pivot about its axis in response to the force applied to the first bearing surface by the spring motor means and the torque arm or the free end of the valve stem. When the latch assembly has pivoted a sufficient angular distance, which is very small, to clear the first bearing surface from the free end of the torque arm or valve stem, the spring motor means rotates the torque arm or valve stem by a sufficient angular distance to close the valve. In the torque arm embodiment, the torque arm correspondingly rotates the valve stem by the same amount to the closed position. Once tripped, the invention may be re-armed in the manner noted above.

In an alternate embodiment of the invention, a solenoid and operating linkage are coupled between the housing and the triggerable catch assembly to provide a triggering action in response to an electrical actuation signal from a condition responsive device, such as a smoke alarm, a gas flow rate indicator, or the like.

In another alternate embodiment of the invention, designed to enable operation of the triggerable catch assembly in response to purely vertical seismic forces, a tension spring is coupled between the trigger arm and a fixed point on the housing to provide a counterbiassing force for the balance plate which functions independently of vertical seismic forces.

In still another embodiment of the invention, the balance plate and trigger arm are mounted adjacent the torque arm on the same side of the pivot axis of the latch assembly in order to shorten the longitudinal axis of the housing and thus provide an extremely compact device.

In this embodiment, the free end of the trigger arm is provided with a curved contour for partially embracing the bearing surface of the second bearing member in order to ensure proper operation of the embodiment.

An optional electrical switch is secured to the housing in a position in which the switch blades are mechanically actuated in response to motion of the torque arm or valve stem after triggering. The switch is coupled to an electrically operated warning indicator, or to an electrically activated condition responsive device, in order to supply an electrical signal indicating that the triggering has occured.

For a fuller understanding of the nature and advantages of the invention, reference should be had to the ensuing detailed description taken in conjunction with the accompanying drawings.

DESCRIPTION OF THE PREFERRED EMBODIMENTS

Figure 1:
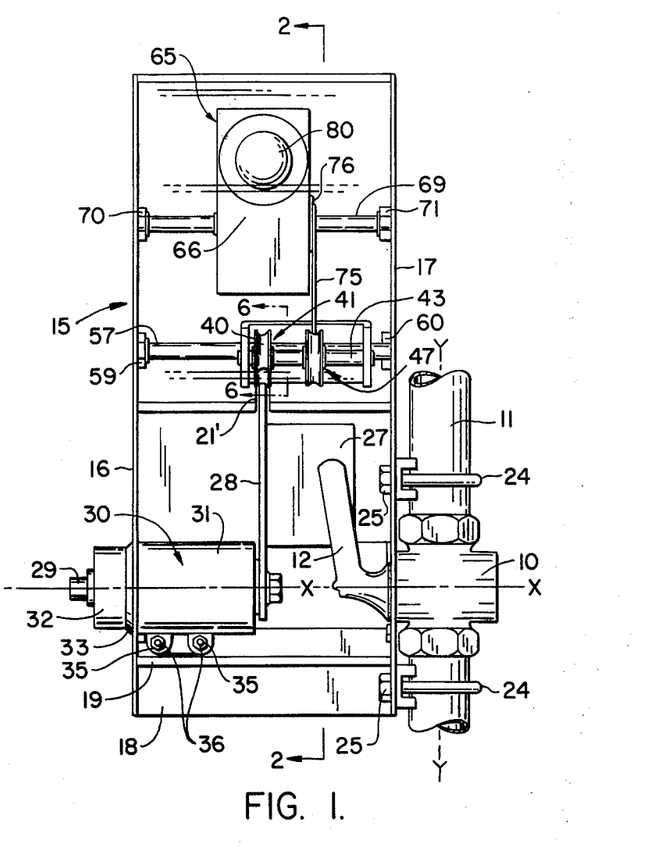
FIG. 1 is a top plan view of the preferred embodiment of the invention installed in a horizontal position.

Turning now to the drawings, FIG. 1 is a top plan view of a preferred embodiment of the invention connected to a gas valve 10 installed in a gas conduit 11 and having a valve stem 12 illustrated in the open position so that gas may flow along conduit 11. The preferred embodiment includes a housing generally designated by reference numeral 15 and having side walls 16, 17 and a bottom wall 18. Housing 15 is preferably fabricated of a high impact plastic material by molding, and includes a reinforcing end wall partition 19 adjacent one end thereof. At the end remote from partition 19, bottom wall 18 is provided with a curved region 20 at the upper end of which a cover member 21 is pivotally or removably connected by joint 22.

Housing 15 is secured to gas conduit 11 by means of U bolts 24 received within suitable apertures inside wall 17, and nuts 25. Other suitable clamping arrangements will be apparent to those skilled in the art.

Figure 2:
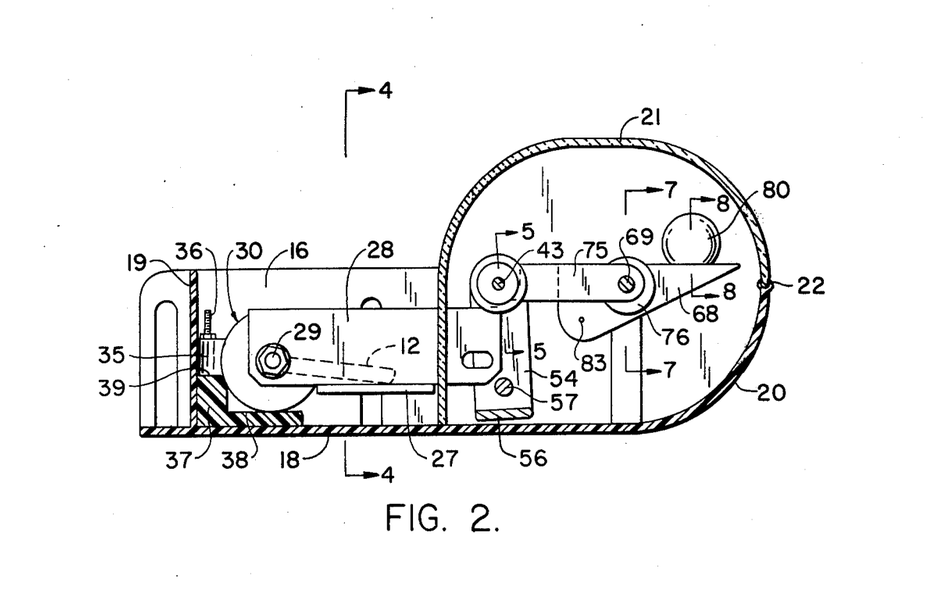
FIG. 2 is a side sectional view taken along lines 2—2 of FIG. 1 showing the invention fully armed.

As best seen in FIGS. 1 and 2, the undersurface of valve stem 12 contacts the upper surface of a flange portion 27 of a spring motor generally designated by reference numeral 30. In the embodiment shown, spring motor 30 preferably comprises a commercially available hydraulically damped door closure device having a casing with a generally cylindrical main body portion 31, an end body portion 32 also of generally cylindrical configuration and a tapered portion 33 joining casing portions 31 and 32. Casing portions 32 and 33 extend through a suitably sized aperture in side wall 16 which contacts the outer periphery of the casing at the junction of casing portions 31 and 33 to provide a snug fit therefore, Casing portion 31 is further provided with a pair of radially extending lugs 35 having apertures through which mounting bolts 36 secured to a mounting block 37 extend. As best seen in FIG. 2, mounting block 37 has an L-shaped cross section providing a lower surface 38 on which spring motor 30 rests and an upper surface 39 in contact with the lower edges of lugs 35. Upper surface 39 also provides a limit stop for motion of torque arm 28 in the manner described below.

The combination of contacting surfaces 38 and 39, lugs 35 and the snug fit of the casing of spring motor 30 in the aperture in side wall 16 prevents any appreciable twisting of the spring motor 30 when the device is fully armed in the manner shown in FIGS. 1 and 2.

Figure 4:
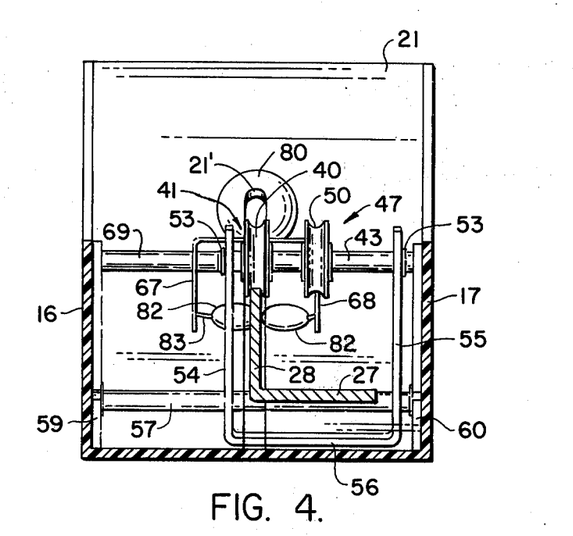
FIG. 4 is a sectional view taken along lines 4—4 of FIG. 2.
Figures 5, 9:
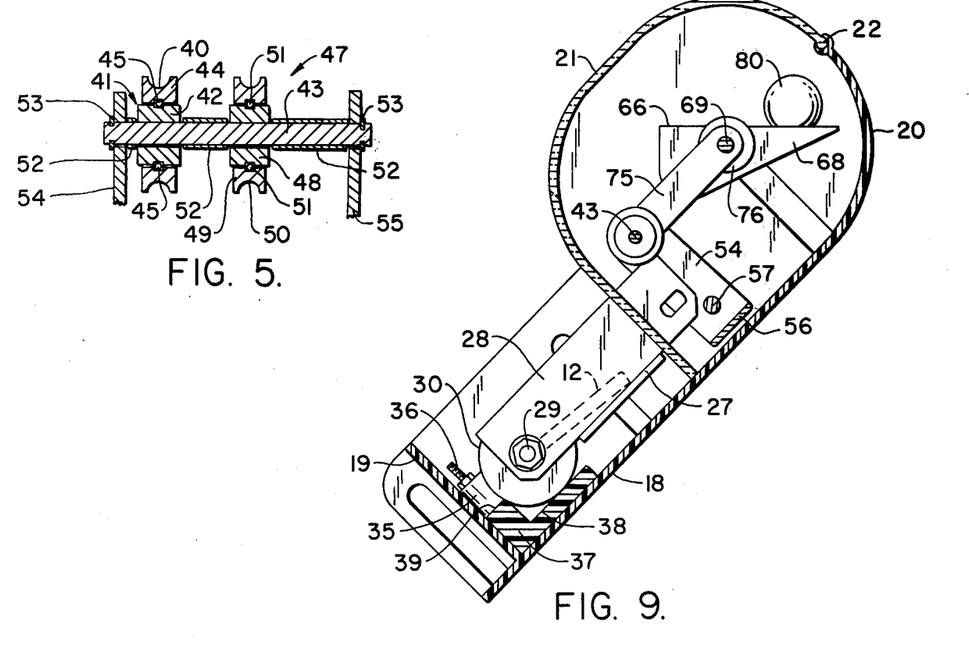
FIG. 5 is an enlarged sectional view taken along lines 5—5 of FIG. 2.
FIG. 9 is a view similar to FIG. 2 showing the invention mounted at an angle with respect to horizontal.
Figure 6:
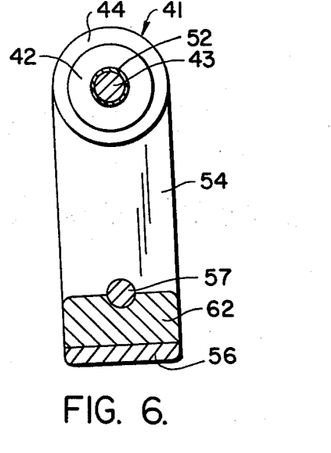
FIG. 6 is an enlarged partial sectional view taken along lines 6—6 of FIG. 1 showing an alternate arrangement of the latch support member.

The end of torque arm 28 remote from motor shaft 29, hereinafter referred to as the free end of torque arm 28, contacts a first bearing surface 40 of a bearing 41 of a latch assembly. As best seen in FIGS. 4–6, bearing 41 comprises a central body portion 42 fitted onto a shaft 43, an outer body portion 44 and a plurality of ball bearings 45 located in complementary bearing races to permit low friction rotation of outer body portion 44 with respect to central body portion 42. A second bearing generally designated by reference numeral 47 and constructed substantially identically with bearing 41 also includes a central body portion 48, outer body portion 49 providing a second bearing surface 50 and ball bearings 51 located in complementary races between body portions 48 and 49. Bearings 41 and 47 are maintained in mutually spaced alignment on shaft 43 by means of cylindrical spacers 52. Other equivalent spacer devices, e.g., circlips received in slots formed in shaft 43, may be employed, if desired.

Shaft 43 is journaled by means of clips 53 to a pair of side rails 54, 55 of the generally U-shaped support member having a connecting bottom rail 56 (FIG. 4). The support member is pivotally secured to a shaft 57 having opposed ends received in supporting cradles formed in vertically extending reinforcing ribs 59, 60 formed on side walls 16, 17. As shown in FIG. 6, if desired, a counter weight 62 may be inserted between lower rail 56 and shaft 57 to provide more balanced pivoting action of the support member and bearing assembly.

Figure 7:
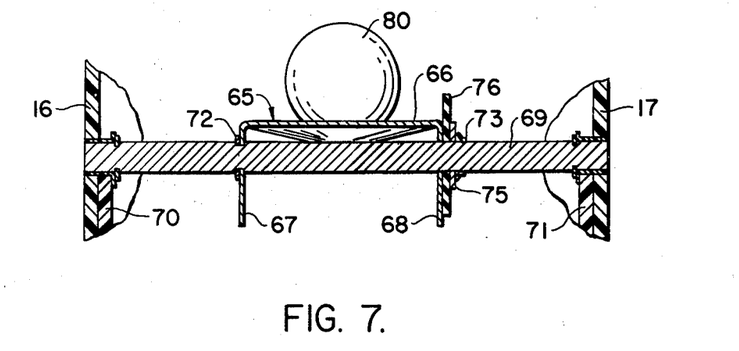
FIG. 7 is an enlarged sectional view taken along lines 7—7 of FIG. 2.

Positioned rearwardly of shaft 57 in housing 15 is a balance plate 65 having a top wall 66 and downwardly depending side walls 67, 68. Balance plate 65 is mounted on a shaft 69 for pivotal movement about the axis defined thereby, with shaft 69 being supported in cradles provided by vertically extending rib portions 70, 71 formed in side walls 16, 17 (FIG. 7). The axial position of balance plate 65 is maintained by clips 72, 73 which prevent translation of balance plate 65 along the shaft 69. A trigger arm 75 is frictionally secured to side wall 68 of balance plate 65 preferably by means of a friction disc 76 fabricated from rubber or the like. This arrangement permits the relative position of balance plate 65 and trigger arm 75 to be adjusted during installation in the manner described below.

The end of trigger arm 75 remote from shaft 69, hereinafter designated the free end of trigger arm 75, contacts bearing surface 50 of bearing 47 when the device is armed. To insure stability of the device as armed, the free end of trigger arm 75 is preferably provided with a slight concave contour terminating in jutting lower portion 78 tending to inhibit clockwise rotation as viewed in FIG. 2 past a position in which trigger arm 75 and torque arm 28 are substantially parallel.

Figure 8:
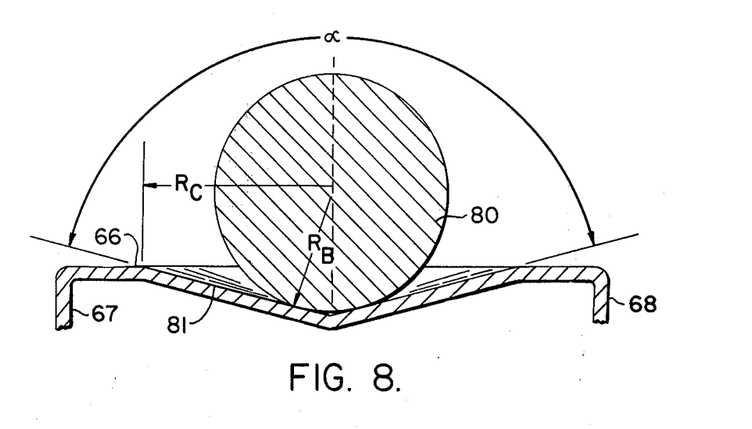
FIG. 8 is an enlarged sectional view taken along lines 8—8 of FIG. 2.

The top wall 66 of balance plate 65 is provided with a concave depression rearwardly of shaft 69 for receiving a substantially spherical ball weight 80 of radius $R_B$. As best shown in FIG. 8, the preferred contour of this depression is a conic section having an apex angle and radius $R_c$ with values chosen in the manner described in detail below.

An opposing counter bias means, e.g., counterweight 82 (FIG. 4), is mounted to side walls 67, 68 of balance plate 65 by means of a wire 83 or other suitable fastening means at a position forward of shaft 69.

The device is assembled in the following fashion. Torque arm 28 is attached to shaft 29 of motor 30, and motor 30 is secured to mounting block 37 in the attitude depicted in FIGS. 1 and 2. Bearings 41, 47 are next installed on shaft 43 along with spacers 52, shaft 43 journaled into side rails 54, 55, shaft 57 inserted through side rails 54, 55 and this assembly is installed in the cradles afforded by ribs 59, 60. Counter balance weights 82 are next installed on balance plate 65, balance plate 65 is installed on shaft 69 together with trigger arm 75 and friction disc 76, and this assembly is installed in the cradles afforded by ribs 70, 71.

Once assembled, the device is ready for attachment to the gas conduit 11 in the manner shown in FIG. 1. Initially, assuming the axis Y—Y of gas conduit 11 is already horizontal, the axis X—X of gas valve 19 (FIG. 1) is aligned to a horizontal attitude by rotating valve 10 about the axis Y—Y of gas conduit 11, if necessary, after which the device is attached to conduit 11 in the manner shown in FIG. 1. Next, the device is armed in the following manner.

Torque arm 28 is rotated in the clockwise direction as viewed in FIG. 2 against the force of the spring motor 30. Next, the support member consisting of side rails 54, 55 and bottom rail 56 is pivoted about shaft 57 in a counterclockwise direction as viewed in FIG. 2 until the free end of torque arm 28 contacts bearing surface 40. Thereafter, balance plate 65 and trigger arm 75 are rotated about the axis defined by shaft 69 until the free end of trigger arm 75 makes contact with bearing surface 50. If gas conduit 11 is horizontal, and trigger arm 75 and wall 66 of balance plate 65 are mutually parallel, no relative adjustment is required therebetween. If trigger arm 75 and top wall 66 of balance plate 65 are not mutually parallel, balance plate 65 is rotated with respect to trigger arm 75 while maintaining the free end of trigger arm 75 in contact with bearing surface 50 until arm 75 and wall 66 are mutually parallel. Thereafter, ball weight 80 is placed in the depression formed in the top wall 66 of balance plate 65. Cover 21 is then closed and the device is fully armed.

Figure 3:
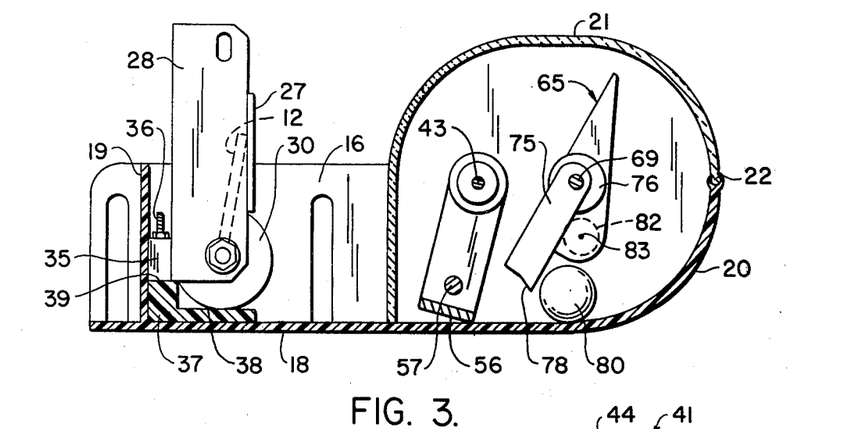
FIG. 3 is a view similar to FIG. 2 showing the invention after triggering.

Upon the occurrence of an earthquake type seismic vibration, ball weight 80 rolls up concic section portion 81 of balance plate 65, across the flat portion of top wall 66 and either drops into the void on either side of balance plate 65 or moves towards or away from shaft 69, depending on the direction of the force due to the vibration as experienced by the ball weight 80. For example, if the force attributable to the seismic vibration is directed generally to the left in FIG. 2, ball weight 80 rolls towards shaft 69 directly. If the vibration force is directed generally to the right in FIG. 2, ball weight 80 rolls away from shaft 69 towards the inner surface of cover 31, strikes this surface, and rebounds to the left towards shaft 69. Regardless of the initial direction of motion of ball weight 80, it quickly reaches a position in which balance plate 65 becomes unbalanced. When this condition obtains, balance plate 65 pivots in a counterclockwise direction as viewed in FIG. 2 under the influence of counterweights 82. Trigger arm 75 follows this motion and disengages from bearing surface 50 of bearing 47, thereby enabling pivotal motion in the clockwise direction of the latch assembly support member about shaft 57. Spring motor 30 acts on torque arm 28 to force the latter to rotate in the counterclockwise direction as viewed in FIG. 2 and the free end of torque arm 28 provides a force on bearing surface 40 which pivots the latch assembly support member in the clockwise direction. Once bearing surface 40 disengages from the free end of torque arm 28, the full force of spring motor 30 quickly rotates torque arm 28 in the counterclockwise direction until the secured end of torque arm 28 engages upper surface 39 of mounting block 37 whence further motion ceases (FIG. 3). During motion of torque arm 28, valve stem 12 is forced to the closed position illustrated in FIG. 3 by flange portion 27.

To ensure that the latch assembly support member is pivoted in the clockwise direction by the free end of torque arm 28, the axis of shaft 57 is located beyond the free end of torque arm 28 in the embodiment under discussion. A similar result may be obtained by forming the upper edge of the free end of torque arm 28 with a convex contour of a bevel similar to that depicted for the lower edge. However, the former arrangement is presently preferred, and the following considerations apply.

Latch bearing 41 is depressed onto the free end of torque arm 28 beyond the equilibrium point that a frictionless latch assembly would obtain on an extended torque arm. This depressed position results in a rolling force tending to move bearing 41 towards the equilibrium position (directly centered over the axis of shaft 57), and this rolling force is sufficiently greater than the opposing rolling frictional force in order to guarantee movement of the latch assembly in the clockwise direction of FIG. 2. In the preferred embodiment, the magnitude of the rolling force is designed to be approximately twice that of the frictional force.

In addition, the latch assembly is so arranged with respect to the torque arm 28 that the bearing surface 40 clears the free end of torque arm 28 before the latch assembly reaches the equilibrium position. More precisely, bearing surface 40 clears the free end of torque arm 28 before the magnitude of the rolling force becomes equal to the magnitude of the frictional force. In the preferred embodiment, the free end of torque arm 28 terminates at a point at which the latch assembly is at an angle of approximately 1.7° with respect to its equilibrium position.

Figure 12:
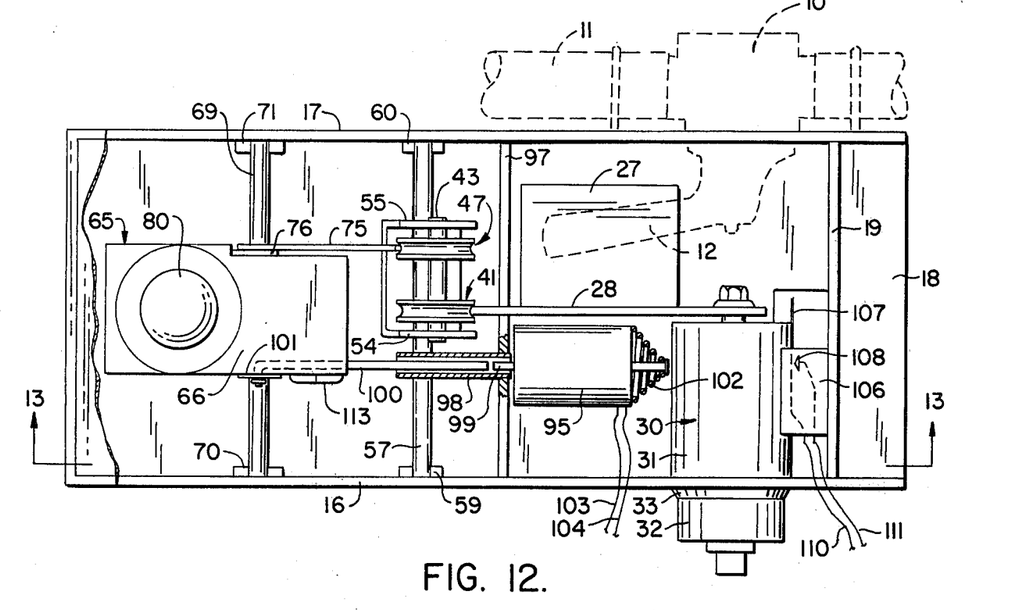
FIG. 12 is a top view similar to FIG. 10 of an alternate embodiment of the invntion.
Figure 13:
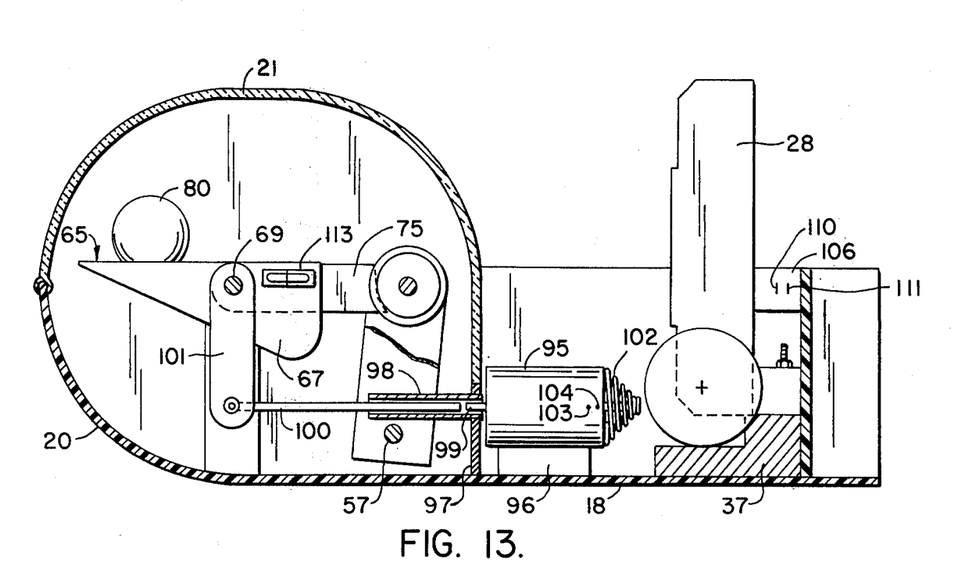
FIG. 13 is a side sectional view taken along lines 13—13 of FIG. 12 showing this alternate embodiment after triggering.

Should conduit 11 be disposed at an angle with respect to horizontal, as shown in FIG. 9, the invention can be readily adjusted to accommodate such an attitude by merely adjusting the relative positions of trigger arm 75 and balance plate 65 so that the upper wall 66 is horizontal while trigger arm 75 remains parallel with torque arm 28 when the device is fully armed. If desired, a small bulls-eye bubble level may be placed on top wall 66 of balance plate 65 to facilitate this adjustment. Further, such a level may be permanently installed on balance plate 65, if desired, or a side level 113 may be permanently installed as shown in FIGS. 12 and 13.

Should the axis of rotation X—X of valve 10 not be coincident with the axis of shaft 29 of motor 30, this alignment may be made by repositioning housing 15 along the axis Y—Y of the conduit 11 and then by repositioning valve 10 with respect to conduit 11 in the manner noted supra. Thus, the invention may be installed on a gas conduit 11 regardless of the orientation of the conduit.

Cover 21 in combination wth bottom wall 18 including portion 20, affords a protective enclosure for the sensitive elements of the invention. Thus, once installed and armed, the invention cannot be accidentally triggered by a prowling animal or a playful child. In order to facilitate closing of the cover 21, a slot 21' is formed which extends from the lower front edge of cover 21 to a position slightly above the height of the forward portion of housing side walls 16, 17.

The invention may be tailored to respond to seismic vibrations of predetermined horizontal acceleration by setting the apex angle of conic section 81, and to predetermined amplitude by setting the radius of conic section as it meets the upper face of the balance plate.

As an example of setting the apex angle of the cone, suppose that it is desired to have the device trigger at a horizontal acceleration greater than or equal to 20% g, where g is the magnitude of the earth's vertical gravitational acceleration. Then the ratio of the depth to the radius of the cone would be set to 1.20. This would be equivalent to a one-half apex angle of 78.69°.

It should be noted that housing 15 is designed symmetrically with respect to the long axis thereof and that torque arm 28 is symmetric about its transverse axis. Because of this design, the relative positions of valve 10 and spring motor 30 may be interchanged to accommodate a mirror image arrangement to that depicted in FIG. 1. Thus, the unit may be operatively connected to a valve 10 from either the right or the left hand side. This preferred symmetry affords even greater flexibility to use of the invention.

Figure 10:
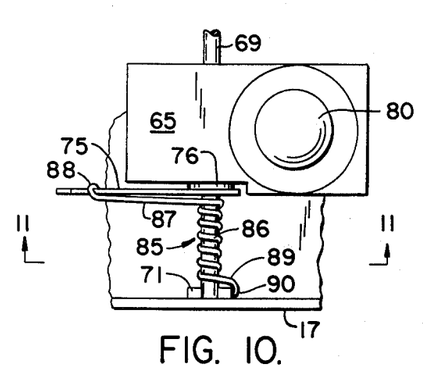
FIG. 10 is a fragmentary top plan view illustrating a modification to the triggering mechanism.
Figure 11:
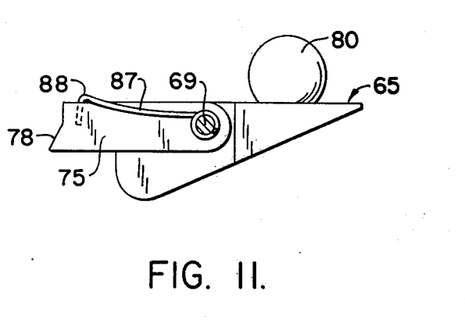
FIG. 11 is a partial view taken along lines 11—11 of FIG. 10.

FIGS. 10 and 11 illustrate a modification to the triggering mechanism which may be optionally provided to enhance even further the adaptability of the invention. As shown in these FIGS., the counterweights 82 are replaced by a coil spring generally designated by reference numeral 85 and having a central body portion 86 disposed about the end of shaft 69 adjacent side wall 17, a first arm portion 87 extending generally parallel to trigger arm 75 and terminating in a downwardly depending hook portion 88 in contact with the free end 78 of trigger arm 75, and a second arm 89 having a hook portion 90 abutting the rear vertical edge of rib 71 formed in side wall 17. Spring 85 is tensioned to provide a counterclockwise force on trigger arm 75 as viewed in FIG. 11 which is sufficient to rotate balance plate 65 in the absence of ball weight 80 in a manner equivalent to the action of the replaced counterweights 82. The frictional force between trigger arm 75 and balance plate 65 is sufficient to prevent relative motion between these two elements. The purpose for this arrangement is as follows.

There exists a highly remote, but real, possibility that a seismic vibration experienced by the device may have no horizontal components and be entirely vertical. Absent the provision of spring 85, a downward vertical acceleration experienced by balance plate axis 69 will raise the ball weight 80 from the concave depression provided in the top wall 66 of balance plate 65. However, counterweights 82 will simultaneously experience an upward vertical force with respect to axis 69 tending to rotate balance plate 65 in the clockwise direction. This motion of balance plate 65 is prevented by the contact between free end 78 of trigger arm 75 and bearing surface 50 of bearing 47. The result is that balance plate 65 with counterweights 82 is maintained stationary during the downward vertical acceleration of axis 69. If this displacement is sufficiently short so that the ball weight 80 is not deflected by the top wall 20 or 21, there is a possibility that ball weight 80 will return to the rest position in the concave depression in the top wall 66 of balance plate 65 without the occurrence of the desired triggering action.

This possibility is completely eliminated by the provision of spring 85: as soon as the balance plate 65 is unloaded of ball weight 80 by the downward vertical motion of axis 69, the spring force rotates trigger arm 75 in the counterclockwise direction as viewed in FIG. 11, thus initiating the triggering action. A purely upward vertical acceleration will not trigger the invention unless the force is sufficient to forcibly disengage by clockwise rotation as shown in FIG. 2 the lower portion 78 of trigger arm 75 from bearing surface 40. Provision for this may be allowed by suitably sizing the lower portion 78 of trigger arm 75. Otherwise, and preferably, the generally equal and opposite downward component of the vertical acceleration will be sufficient to trigger the invention as described supra in a timely manner.

FIGS. 12 and 13 illustrate an alternate embodiment of the invention provided with an additional triggering capability and a status indicator for signifying when the apparatus has been triggered. As shown in these FIGS., this embodiment incorporates the basic triggering and latching mechanisms described supra. In addition, a solenoid 95 is mounted on the top surface of bottom wall 18 by means of a suitable mounting block 96 immediately forward of a transverse wall 97 extending between side walls 16, 17 of the housing 15. A hollow sleeve 98 is secured to transverse wall 97 with the axis of sleeve 98 parallel to the top surface 66 of balance plate 65 and a plunger 99 forming part of solenoid 95 is slidably received within a first end of sleeve 98. Slidably received within sleeve 98 from the opposite end thereof is an operating rod 100 which is pivotally connected to a downwardly depending link 101 secured to shaft 69. Link 101 may be connected to shaft 69 in any suitable manner, e.g., by means of a friction disc similar to disc 76. Solenoid 95 is provided with a spring 102 for normally maintaining plunger 99 in the retracted position illustrated in FIGS. 12 and 13.

A pair of electrically conducting leads 103, 104 extend from solenoid 95 to an associated control device, such as a smoke detector.

In operation, when the associated control device provides an enabling signal on conductive leads 103, 104, solenoid 95 is actuated, thereby causing plunger 99 to extend to the left as viewed in FIGS. 12 and 13. The free end of solenoid 99 abuts the free end of rod 100, translating this element to the left. In response, link 101 is rotated in the clockwise direction about the axis of shaft 69, thereby rotating balance plate 65 in the same direction to trigger the mechanism.

The control device for operating solenoid 95 may be remotely located, if desired, and may constitute any one of a number of devices for signaling a dangerous condition requiring that the gas valve 10 be closed. As noted above, a smoke detector is one such type of device; other suitable devices are thermal sensors, water pressure indicators installed in an automatic fire responsive sprinkler system, gas leak detectors, a flow rate meter installed in a conduit and capable of generating an electrical signal in response to a sudden surge, and other comparable devices.

It should be noted that the solenoid 95 and associated elements operate as an alternate triggering mechanism which is supplemental to the basic triggering mechanism described above. In addition, this alternate and supplemental triggering mechanism in no way interferes with the operation of the basic triggering mechanism.

Also shown in FIGS. 12 and 13 is a microswitch 106 having a moveable blade 107 and a stationary contact 108 which is mounted to partition 19 of housing 15. Microswitch 106 is arranged in such a manner that moveable blade 107 is engaged by the top surface of torque arm 28 when the latter element approaches the vertical position illustrated in FIG. 13 so that the movable blade 107 contacts the stationary contact 108 when the device has been triggered. Microswitch 106 is provided with electrically conductive leads 110, 111 which may be connected to a local or remote indicator, such as a light bulb or alarm, to provide an operator indication that the device is in the triggered state.

Also illustrated in FIGS. 12 and 13 is a bubble level 113 secured to the side wall 67 of balance plate 65 which facilitates initial adjustment of the horizontal attitude of balance plate 65.

Figure 14:
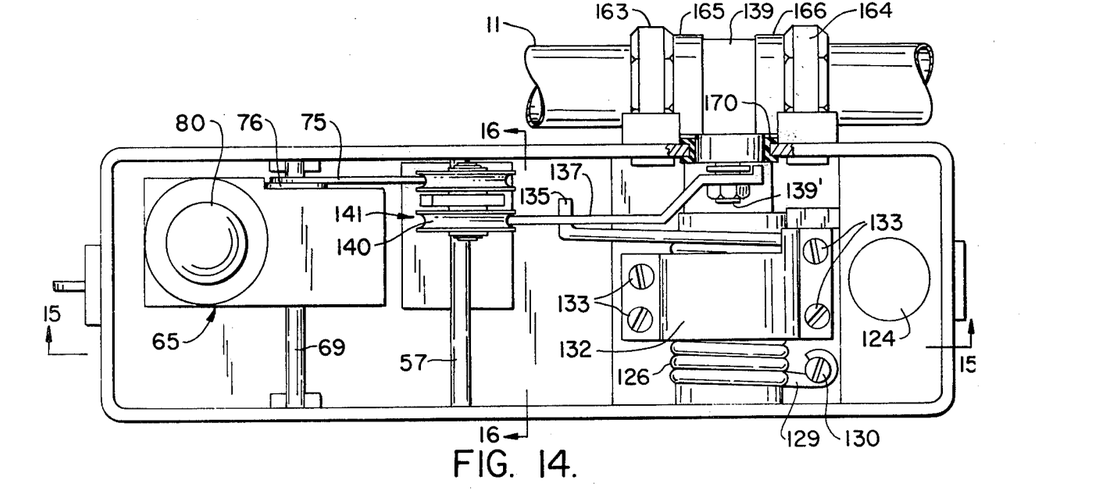
FIG. 14 is a top plan view of an alternate embodiment of the invention with the top casing half removed.
Figure 15:
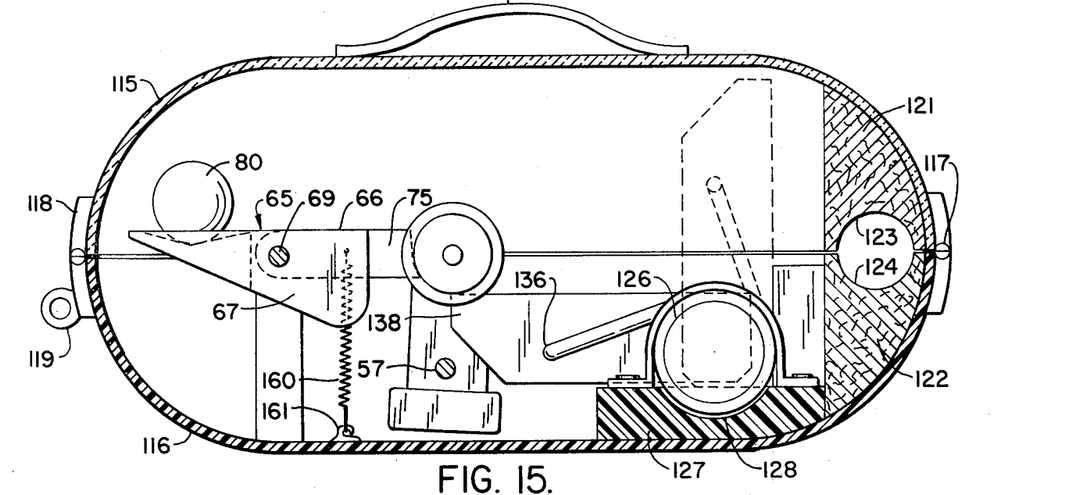
FIG. 15 is a side sectional view taken along lines 15—15 of FIG. 14 with the top casing half included.
Figure 16:
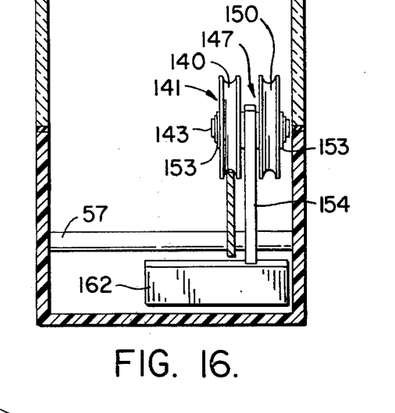
FIG. 16 is a partial section view taken along lines 16—16 of FIG. 14.

FIGS. 14-16 illustrate an alternate embodiment of the invention containing further improvements and refinements. In the embodiment shown in these FIGS., the housing for the device comprises a complementary pair of casing halves 115, 116 provided with a hinge 117 at a first end thereof, and a hinged strap 118 and staple 119 forming a hasp at the other end thereof. Secured to the top of upper casing half 115 is a handle portion 120. Casing halves 115 and 116 are preferably fabricated from molded plastic, and elements 117-120 are integrally molded therewith. If desired, the hinge 117 may be replaced by a similar hinge interconnecting casing halves 115, 116 along mating sides. Positioned at the hinged end of casing halves 115, 116 are a pair of support blocks 121, 122 each provided with a hemispherical depression 123, 124 which together form a spherical cavity when the two casing halves are mated together. Support blocks 121, 122 are preferably fabricated from a foam substance, such as polyurethane foam, and may be secured to their respective casing halves by any suitable means, e.g. an adhesive. The support blocks 121, 122 afford an enclosure for ball weight 80 when the device is being stored or transported to or from an installation site.

In the embodiment of FIGS. 14-16 an alternate form of spring motor means is employed which includes a helical spring 126 supported on a mounting block 127 having a concave upper wall surface 128 with a contour conformable with the general shape of the supported outer surface portion of spring 126. Spring 126 has a fixed end 129 secured by means of a fastener 130 to support block 127. To secure spring 126 against motion with respect to mounting block 127, strap 132 is provided which is anchored to support block 127 by means of fasteners 133. Spring 126 has a movable free end 135 which is angled and received in an aperture 136 in a valve stem 137.

Valve stem 137 functions as the torque arm 28 in this embodiment and has a free end 138 adapted to engage bearing surface 140 of a bearing assembly 141. The remaining end of valve stem 137 is secured on a shaft 138' to which the valve body (not shown) located within a housing 139 is connected.

The latch assembly in the embodiment of FIGS. 14–15 is also modified as shown and includes bearing assemblies 141, 147 having bearing surfaces 140, 150, respectively, both carried on a shaft 143 supported by a single support member 154. Support member 154 is pivotally arranged on shaft 57 and includes a counterbalancing lower portion 162 to which the lower end of support member 154 is connected. It should be noted that the provision of a single support member 154 reduces the required magnitude of counterweight 162 below that required to produce the same pivoting action in the embodiments of FIGS. 1–13. In addition, the perpendicular separation distance between shaft 57 and shaft 143 is less than the corresponding separation distance between shaft 57 and shaft 43 in the embodiments of FIGS. 1–13 which further reduces the magnitude of the counterweight 163 required to provide the same pivoting action as counterweight 62 of the earlier embodiment.

As best seen in FIG. 15, a tension spring 160 is coupled at the upper end thereof to trigger arm 75, and at the other end thereof to a lug 161 secured to the top surface of the bottom wall of lower casing half 116. Spring 160 is arranged in such a manner as to be tensioned in the latched position illustrated and functions as a counter biassing means to rotate balance plate 65 in the clockwise direction as viewed in FIG. 15 when ball weight 80 is dislodged from the conical depression in the upper wall 66 of balance plate 65. Thus, spring 160 functions as a replacement for counterweights 82 in the embodiments of FIGS. 1–13, and performs the same functions as spring 85, as shown in FIGS. 10 and 11, and described supra.

As best shown in FIG. 14, valve housing 139 is secured to lower casing half 116 by means of a pair of clamps 163, 164 which are arranged about the end portions 165, 166 of valve housing 139, rather than conduit 11. Clamps 163 are preferably commercially available articles sold under the trade name Kin-Line Clamps.

As will now be evident, the embodiment of FIGS. 14–16 is extremely compact and smaller in size than the embodiments previously discussed. Further, a water tight seal may be provided around the mating peripheral portions of casing halves 115, 116 and a rubber seal 170 provided in the side wall portion of the lower casing half 116 through which shaft 138 extends to render the entire unit impervious to moisture. In addition, the hasp comprising the strap 118 and staple 119 enables the device to be installed and then locked to prevent any tampering with the internal mechanism. This embodiment is ideally suited to be marketed in kit form with all components contained inside the housing, either totally disassembled or partially disassembled. For example, the device may be packaged for sale with ball weight 80 mounted in the spherical cavity formed by depressions 123, 124, the valve housing 139 and valve stem 137 loosely packaged within the housing enclosure and the remaining elements assembled as shown.

Figures 17, 19:
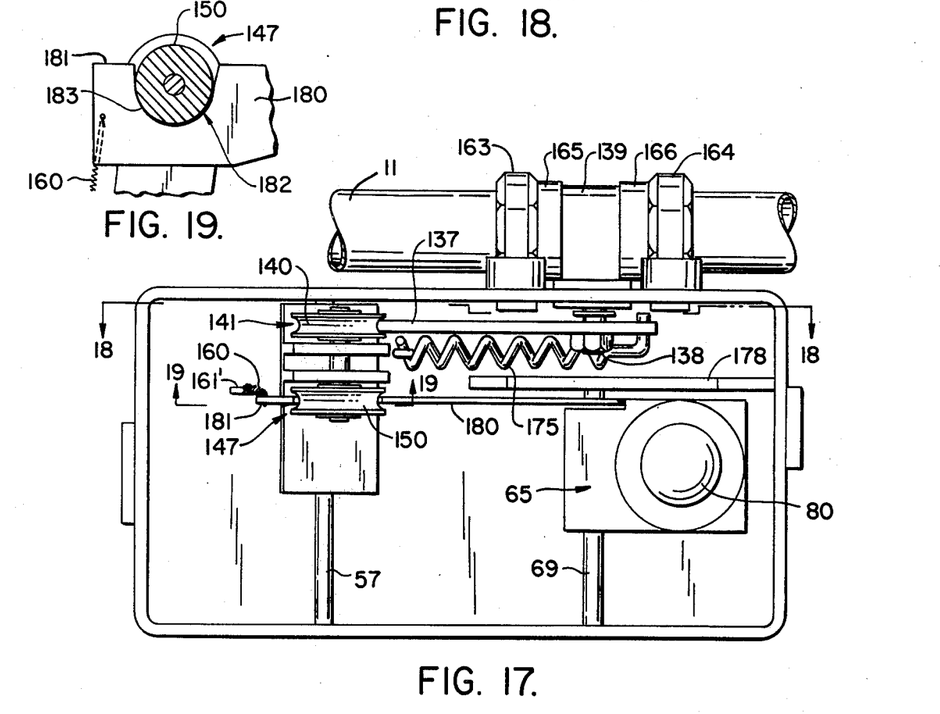
FIG. 17 is a top plan view similar to FIG. 13 of an alternate embodiment of the invention.
FIG. 19 is a partial sectional view taken along lines 19—19 of FIG. 17.
Figure 18:
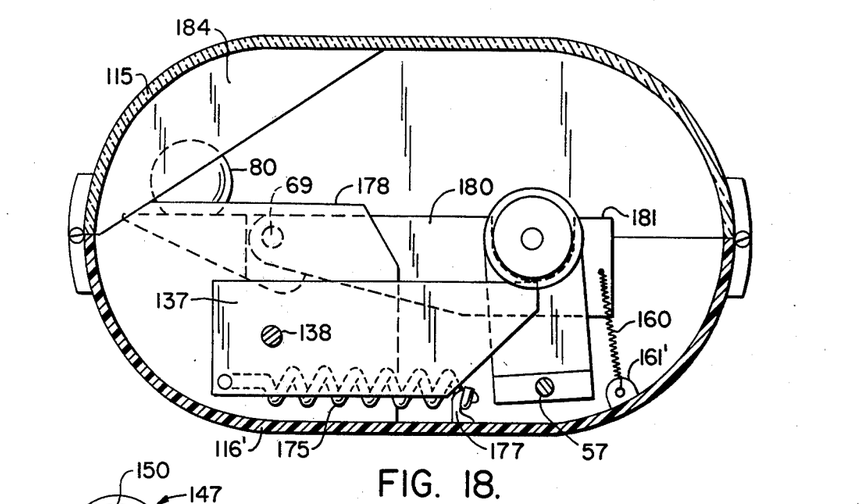
FIG. 18 is a side sectional view taken along lines 18—18 of FIG. 17 with the top casing half included.

FIGS. 17–19 illustrate still another embodiment of the invention in which the torque arm (or valve stem) and trigger arm-balance plate assembly are mounted side-by-side, thus affording a device having a substantially reduced longitudinal dimension. As seen in these FIGS., which illustrate the device in the latched state, valve stem 137 has a free end engaged with bearing surface 140 of a bearing assembly 141 carried by a latch assembly configured in accordance with any of the above discussed embodiments and arranged for pivotal motion about shaft 57. A helical spring 175 is coupled at one end to valve stem 137 in the manner shown, and is secured at the other end to a lug 177 connected to the top surface of the bottom casing half 116'. In the latched state illustrated, spring 175 is in an expanded tensioned state and provides a bias force for valve stem 137 tending to rotate this element in the counterclockwise direction as viewed in FIG. 18.

Balance plate 65 is pivotally mounted on shaft 69 which is supported at one end by a longitudinally extending partition wall 178 and at the other end by a side wall of bottom casing half 116'. Shaft 69, rather than being arranged on the opposite side of shaft 57 from the center of rotation of the valve stem 137, is located on the same side, which necessitates a trigger arm 180 of slightly different configuration.

As best shown in FIG. 19, trigger arm 180 has a free end 181 with a partially circular contour 182 in surface contact with mating portions of bearing surface 150 of bearing assembly 147. In particular, contour 182 includes a portion 183 which opposes motion of the latch assembly in the clockwise direction as viewed in FIG. 18 when the device is in the armed state depicted. A tension spring 160 is coupled at one end to the free end 181 of the trigger arm 180 and at the other end to a lug 161' formed in the bottom casing half 116'.

The operation of the device is essentially similar to that described above in that motion of ball weight 80 in response to an earthquake of predetermined magnitude and acceleration enables spring 160 to pivot trigger arm 180 in the clockwise direction as viewed in FIG. 18, thereby releasing the latch assembly for clockwise motion under the influence of spring loaded valve stem 137. As an added safety feature, the upper casing half 115 is provided with a longitudinally extending partition 184 aligned above partition wall 178 which functions in concert with wall 178 to deflect the movement of ball weight 80 in the event that motion of this element is in the direction of valve housing 139. This ensures that ball weight 80 does not interfere with the triggering operation of the device.

Figure 20:
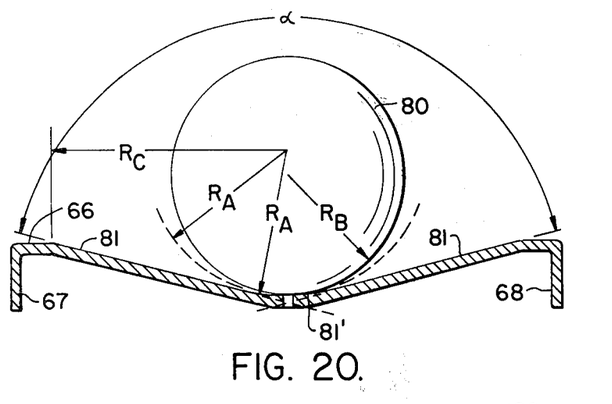
FIG. 20 is an enlarged sectional view similar to FIG. 8 illustrating an alternate contour for the ball weight depression in the balance plate.

FIG. 20 illustrates an alternate contour for the depression in the upper wall 66 of balance plate 65 which has been found useful in providing additional damping for motion of ball weight 80. As seen in this FIG., the depression has a conical portion 81 of apex angle and radius $R_c$. In addition, the depression includes a central portion 81' formed as a partially spherical surface of radius $R_a$ which is greater than the radius $R_b$ of ball weight 80. The central portion 81' provides damping of the motion of ball weight 80 whenever ball weight 80 rolls down conical portion 81 and across portion 81'. This alternate embodiment has been found to reduce amplitude build-up due to oscillatory motion of ball weight 80 in response to small seismic vibrations to ensure against false triggering of the device.

As will now be apparent, the invention provides a highly reliable triggering mechanism for operating an associated control mechanism in response to seismic vibrations of predetermined magnitude and acceleration. The mechanism can also be pre-set to respond to only those seismic vibrations which correspond to an earthquake capable of inflicting serious structural damage to buildings, so that false or premature triggering is avoided. Further, the invention is compatible with valve control mechanisms of any orientation with respect to the ground plane, may be completely symmetric about its body axis and may be easily installed and coupled to existing valves without physical disconnection of a valve from the associated fluid conduit. In addition, the invention may be used with a specially designed valve of the type shown in the embodiments of FIGS. 14–19.

Apparatus constructed according to the invention may be designed for use as an add-on feature to existing valve installations or for use as an integral unit including the valve and trigger mechanism, and may be sold in pre-assembled form or in kit form. Particularly in the latter case, the device housing may function as the packing carton as well as the structural housing, and the operative trigger elements are also shielded thereby to prevent accidental triggering of the device by an outside agency, such as a prowling animal.

The operative elements of the device are further arranged in such a manner that an armed unit may be left installed over extended periods of non-use without fear of failure due to aging of the various components. Thus, periodic inspection and test operation of units constructed according to the invention are unnecessary, and an installed device may simply be left alone.

A key feature of the invention resides in the latch assembly and the triggerable catch assembly which imparts several advantages to devices constructed according to the invention. For example, these two assemblies provide a force amplification factor of large magnitude between the spring motor means and the biassing force provided by the ball weight so that a very light ball weight can be used to control a rather large spring force. In a device actually constructed in accordance with the embodiment of FIGS. 1–8, e.g., a ball weight 80 of approximately two ounces was used to control a spring force of thirty pounds, which comprises an amplification factor of 240. Higher or lower amplification factors can be achieved, as desired, by proper selection of the lineal dimensions of those components comprising the latch assembly and triggerable catch assembly, the weight of ball weight 80, the spring force provided by the spring motor means and the optional bias spring 160, and to a lesser extent the curvature of free end 78 of trigger arm 75, all in a manner which will be obvious to those of ordinary skill in the art.

Further, the triggering action provided by the invention requires very small mechanical motion of the latch assembly and trigger arm 75 so that very little space is required for the components providing the triggering action. Also, ball weight 80 provides a low friction trigger means which is not affected by tensions in the remaining components of the latch assembly and triggerable catch assembly.

It should be noted that the latch and triggerable catch assembly, while described above with specific reference to a valve shut-off device, may be employed in other applications requiring a resettable mechanism for providing controlled release of a relatively large mechanical force applied to a structural member (e.g. a torque arm or a translatable member) by means of a relatively small holding force in response to vibrations of a predetermined magnitude. Further, although the triggerable catch assembly has been illustrated as having symmetry in two orthogonal axes both lying in a plane parallel to the plane of the balance plate top surface, in some applications a one axis device may be preferred. For example, if a device is required which is only sensitive to motion along a particular direction, ball weight 80 may be replaced by a cylinder of radius R and the concave conical depression in balance plate 65 may be replaced by a trough having a triangular cross-section in a plane parallel to the direction of interest. Further, the combination of a ball weight 80 and such a triangular trough may likewise be employed, as desired.

As will now be apparent, the invention described herein may be fabricated at extremely low cost, and is capable of being assembled (if sold in kit form) and installed by persons having no special technical skills. In addition, the invention may be employed with a wide variety of control mechanisms, such as gas valves, pumps and valves incorporated in a solar heating installation, or other motion responsive control mechanisms, as well as control mechanisms responsive to electrical signals. In addition, the invention can be electrically triggered by control devices such as smoke detectors, so that devices constructed according to the invention can function both as active (i.e., control initiating) and passive (i.e. control responsive) safety mechanisms.

While the above provides a full and complete disclosure of the preferred embodiments of the invention, various modifications, alternate constructions and equivalents may be employed without departing from the true spirit and scope of the invention. Therefore, the above description and illustrations should not be construed as limiting the scope of the invention which is defined by the appended claims.

What is claimed is:

1. A valve shut-off device for operating an associated valve means in response to seismic vibrations of predetermined magnitude, said valve means having an externally operable movable valve mechanism, said device comprising:

a housing having a base and an opposed pair of side wall members;

spring bias means secured to said housing adjacent a first end thereof;

torque arm means adapted to be coupled to said movable valve mechanism and having a first portion coupled to said spring bias means and a free end;

said spring bias means providing a biasing force tending to rotate said torque arm means about a predetermined first axis in a predetermined angular direction;

latch means for normally preventing rotation of said torque arm means in said predetermined angular direction, said latch means being pivotally mounted to said housing for rotation about a second axis substantially parallel to said first axis and including first bearing means normally engaged with said free end of said torque arm means when said device is armed, and second bearing means; and triggerable catch means for normally maintaining said latch means in contact with said torque arm means and for enabling said latch means to disengage said torque arm means in response to said seismic vibrations, said triggerable catch means including balance plate means pivotally mounted to said housing for rotation about a third axis substantially parallel to said second axis, trigger arm means coupled to said balance plate means and movable therewith, said trigger arm means having a portion normally engaged with said second bearing means when said device is armed, and trigger means for enabling said balance plate means to rotate said trigger arm means about said third axis to disengage said normally engaged portion of said trigger arm means from said second bearing means in response to said seismic vibrations so that said latch means disengages said torque arm means to enable said spring bias means to rotate said torque arm means in said predetermined angular direction.

2. The combination of claim 1 wherein said spring bias means comprises an hydraulically damped door closer.

3. The combination of claim 2 wherein at least one of said side walls is provided with a through aperture and said spring bias means includes a casing having first and second end portions, said torque arm being located adjacent said first end portion, said second end portion being received by said through aperture.

4. The combination of claim 3 wherein both of said side walls are provided with a through aperture, said through apertures being mutually aligned, and wherein said second end portion of said spring bias means is received by one of said through apertures.

5. The combination of claim 1 wherein said spring bias means comprises a tensioned spring having a first end coupled to said housing and a second end coupled to said torque arm means.

6. The combination of claim 5 wherein said tensioned spring is a helical spring having an axis substantially parallel to said first axis.

7. The combination of claim 5 wherein said tensioned spring is a helical spring having an axis extending along at least one of said side wall members of said housing.

8. The combination of claim 1 wherein said housing includes limit stop means for limiting rotation of said torque arm means to a predetermined angular amount when said device is triggered.

9. The combination of claim 8 wherein said angular amount is substantially 90°.

10. The combination of claim 8 wherein said limit stop means comprises a cross member extending between said side walls adjacent said first end of said housing and having at least one surface engageable with a portion of said torque arm means when said torque arm means has been rotated by said predetermined angular amount.

11. The combination of claim 10 wherein said spring bias means is secured to said cross member.

12. The combination of claim 1 further including switch means coupled to said housing and having blade means engageable with said torque arm means when the latter is rotated in said predetermined angular direction by a predetermined amount to operate said switch means.

13. The combination of claim 1 wherein said valve means includes a valve stem, and wherein said torque arm means includes means engageable with said valve stem.

14. The combination of claim 1 wherein said latch means includes a support member having at least one rail extending from said first and second bearing means to said second axis and provided with first and second through apertures spaced therealong, and a first pivot shaft extending along said second axis and received within one of said first and second through apertures in said rail.

15. The combination of claim 14 wherein said latch means further includes a mounting shaft extending substantially parallel to said first pivot shaft and received within the other one of said first and second through apertures, said first and second bearing means being carried by said mounting shaft.

16. The combination of claim 14 wherein at least one of said first and second bearing means includes an annular bearing element having a peripheral groove.

17. The combination of claim 14 wherein said latch means further includes a counter-balance weight positioned adjacent said first pivot shaft.

18. The combination of claim 1 wherein said latch means includes a support member having a pair of interconnected side rails spaced along said second axis and provided with first and second pairs of mutually aligned through apertures at different locations along said side rails, and a first pivot shaft extending between said side walls of said housing and received within one of said first and second pairs of mutually aligned through apertures in said side rails.

19. The combination of claim 18 wherein said latch means further includes a mounting shaft extending substantially parallel to said first pivot shaft and received within the other one of said first and second pairs of through apertures, said first and second bearing means being carried by said mounting shaft.

20. The combination of claim 1 wherein said balance plate means includes a platform, and a pair of flanking side wall members each having a through aperture aligned along said second axis; and wherein said triggerable catch means includes a second pivot shaft extending between said side walls of said housing and received within said aligned through apertures in said side wall members of said balance plate.

21. The combination of claim 20 wherein said trigger arm means is mounted on said second pivot shaft adjacent one of said side wall members of said balance plate means, and wherein said triggerable catch means includes means for frictionally engaging said trigger arm means with said adjacent one of said side wall members.

22. The combination of claim 1 wherein said trigger means comprises a ball weight supported by said balance plate means and adapted to be dislodged therefrom in response to said seismic vibrations.

23. The combination of claim 22 wherein said balance plate means includes a ball weight seat portion having a predetermined contour, and said ball weight is supported by said seat portion.

24. The combination of claim 23 wherein said predetermined contour is substantially conical.

25. The combination of claim 24 wherein the half apex angle of said conical contour is in the range of from about 60° to less than 90°.

26. The combination of claim 23 wherein said seat portion is formed in said platform at a first off-axis position from said second pivot shaft.

27. The combination of claim 23 wherein said ball weight has a radius R and said seat portion has a central concave portion with a radius of curvature greater than R.

28. The combination of claim 27 wherein said predetermined contour of said seat portion includes a substantially conical portion terminating in said central concave portion.

29. The combination of claim 22 wherein said ball weight is supported by said balance plate means at a first location off-axis from said second pivot shaft, and wherein said triggerable catch means further includes a trigger counter bias means coupled to said balance plate means at a second location off-axis from said pivot shaft in the opposite sense from said first location.

30. The combination of claim 22 further including a pair of mating support blocks secured to facing inner surfaces of said housing, said support blocks including facing concave portions providing a storage recess for said ball weight.

31. The combination of claim 1 wherein said triggerable catch means further includes a trigger counter-bias means coupled between said trigger arm means and said housing.

32. The combination of claim 1 further including an independently operable actuating means for said triggerable catch means, said independently operable actuating means comprising an electrically operable solenoid means coupled to said housing, and link means coupled to said solenoid means and said balance plate means for rotating said balance plate means about said third axis in response to receipt of a control signal by said solenoid means.

33. The combination of claim 1 wherein said first axis, said second axis and said third axis are mutually spaced in serial fashion along the longitudinal axis of said housing.

34. The combination of claim 1 wherein said first axis and said third axis are each located a shorter distance from one end of said housing than said second axis.

35. The combination of claim 33 wherein said torque arm means and said trigger arm means both comprise juxtaposed elongated members extending in the direction of said second axis.

36. The combination of claim 35 wherein said housing includes a first partition wall positioned between said torque arm means and said trigger arm means and extending upwardly from said base, said first partition wall terminating in an upper edge having a portion lying above said balance plate means.

37. The combination of claim 36 wherein said housing further includes a cover member having a complementary geometrical configuration to said base and said side wall members, said cover member including a second partition wall extending in the direction of said base and terminating in a lower edge in contact with a portion of said upper edge of said first partition wall when said cover is closed.

38. The combination of claim 34 wherein said trigger arm means includes a free end having a concave surface partially embracing said second bearing means, and wherein said trigger means includes tension spring means coupled to said trigger arm means and said housing.

39. The combination of claim 1 wherein said housing further includes an end wall member remote from said first end and having a concave inner surface, and a cover member coupled to said end wall member and having a concave inner surface, said cover member, said end wall member and a portion of said base member and said housing side walls defining a protective enclosure for said latch means and said triggerable catch means when said cover member is installed.

40. The combination of claim 39 wherein said cover member is hinged to said end wall member.

41. The combination of claim 1 wherein said housing further includes opposing end wall portions each having a concave inner surface, and a cover member coupled to one of said end wall members and having a complementary geometrical configuration to said base, said opposed pair of side wall members and said opposing end wall portions defining a protective enclosure for said spring bias means, said torque arm means, said latch means and said triggerable catch means.

42. The combination of claim 41 wherein said cover is hinged to one of said end wall portions.

43. A vibration sensitive combination latch and triggerable catch assembly for providing controlled release of a relatively large mechanical force applied to a structural member by means of a relatively small holding force in response to vibrations of a predetermined magnitude, said assembly comprising:

latch means adapted to be mounted for pivotal motion about a first axis, said latch means including at least one rail member, means for enabling said rail member to be mounted for said pivotal motion about said first axis, a bearing shaft carried by said rail member and having an axis substantially parallel to said first axis and spaced therefrom, first and second bearing means carried by said bearing shaft and mutually spaced therealong, said first bearing means being adapted to physically engage said structural member; and triggerable catch means for normally maintaining physical engagement between said first bearing means and said structural member in the absence of vibrations of said predetermined magnitude and for enabling release of said structural member by said first bearing means when said vibrations of said predetermined magnitude occur, said triggerable catch means including balance plate means adapted to be mounted for pivotal motion about a second axis substantially parallel to and spaced from said first axis, said balance plate means including a platform having a concave depression formed therein, means for enabling said balance plate means to be mounted for said pivotal motion about said second axis, trigger arm means coupled to said balance plate means for normal pivotal motion therewith about said second axis, said trigger arm means having a portion normally engaged with said second bearing means to prevent pivotal motion of said latch means about said first axis in a direction that would release said structural member when said assembly is armed, weighting means normally received by said concave depression for providing a biasing force of sufficient magnitude to enable said trigger arm means to prevent said pivotal motion of said latch means about said first axis in said release direction, said concave depression having a predetermined contour permitting vibrations of at least said predetermined magnitude to dislodge said weighting means therefrom to thereby release said balance plate means and said trigger arm means for rotation about said second axis in a direction permitting disengagement of said normally engaged portion of said trigger arm means from said second bearing means so that said latch means is released for pivotal motion about said first axis in said release direction to disengage said first bearing surface from said structural member.

44. The combination of claim 43 wherein said rail member is provided with a bias weight.

45. The combination of claim 43 wherein said latch means includes a pair of mutually spaced substantially parallel rail members, and wherein said bearing shaft extends between said rail members adjacent one end thereof.

46. The combination of claim 43 wherein at least one of said first and second bearing means includes an annular bearing element having a peripheral groove.

47. The combination of claim 43 wherein said balance plate means further includes at least one side wall member coupled to said platform, and wherein said triggerable catch means includes means for engaging said trigger arm means with said at least one side wall member of said balance plate means.

48. The combination of claim 43 wherein said concave depression is substantially conical.

49. The combination of claim 48 wherein the half apex angle of said conical concave depression is in the range from about 60° to less than 90°.

50. The combination of claim 48 wherein said concave depression has a central partially spherical portion.

51. The combination of claim 50 wherein said weighting means comprise a ball of radius R, and wherein the radius of curvature of said partially spherical portion is greater than R.

52. The combination of claim 43 wherein said triggerable catch means further includes counterbiassing means providing a counterbiassing force acting in the opposite angular direction from said biassing force provided by said weighting means, said counterbiassing force being less than said biassing force.

53. The combination of claim 52 wherein said counterbiassing means comprises additional weighting means coupled to said balance plate means in a region thereof located between said first and second axes.

54. The combination of claim 52 wherein said counterbiassing means comprises spring means coupled to said trigger arm means.

* * * * *